United States Patent [19]

Takeuchi

[11] 4,350,077

[45] Sep. 21, 1982

[54] DIFFERENTIAL PRESSURE OPERATED SERVO BOOSTERS

[75] Inventor: Hiroo Takeuchi, Asashina, Japan

[73] Assignee: Nissin Kogyo Kabushiki Kaisha, Ueda, Japan

[21] Appl. No.: 171,403

[22] Filed: Jul. 23, 1980

[30] Foreign Application Priority Data

Jul. 24, 1979 [JP] Japan .......................... 54/102072[U]

[51] Int. Cl.³ ........................... F15B 9/10; F16J 11/02
[52] U.S. Cl. .................................... 91/376 R; 92/168; 92/170
[58] Field of Search ............ 91/369 A, 369 B, 369 R, 91/376 R, 391 R, 434, 431; 92/48, 49, 98 D, 98 R, 99, 100, 169, 170, 168

[56] References Cited

U.S. PATENT DOCUMENTS

| 2,457,721 | 12/1948 | Price | 91/369 B |
| 3,104,590 | 9/1963 | Kellogg et al. | 91/376 R |
| 3,177,777 | 4/1965 | Kenrick | 91/376 R |

FOREIGN PATENT DOCUMENTS

| 970000 | 6/1975 | Canada | 91/376 R |
| 549300 | 11/1942 | United Kingdom | 91/376 R |

*Primary Examiner*—Paul E. Maslousky
*Attorney, Agent, or Firm*—Armstrong, Nikaido, Marmelstein & Kubovcik

[57] ABSTRACT

An improved differential pressure operated servobooster herein disclosed comprises a booster shell, a forward first fluid chamber and a rearward second fluid chamber defined by a booster piston within the booster shell and normally in communication with a vacuum source, a cylindrical valve body integrally extended at the rearward surface of the booster piston and slidably supported on the rearward side wall of the booster shell through a plain bearing, a control valve received within the cylindrical valve body to permit the second fluid chamber to selectively communicate with the first fluid chamber or atmosphere, and an input rod disposed with the cylindrical valve body and operatively connected to the control valve, the plain bearing being formed integral with the rearward side wall of the booster shell in a seamless fashion. Preferably, the booster shell and the plain bearing are integrally formed of a synthetic resin, and the cylindrical valve body is formed of a synthetic resin of higher hardness than that of the plain bearing.

1 Claim, 2 Drawing Figures

DIFFERENTIAL PRESSURE OPERATED SERVO BOOSTERS

BACKGROUND OF THE INVENTION

1. Field of the Invention

The present invention relates to differential pressure operated servo-boosters, especially for vehicle brake systems, and more particularly to improvements in servo-boosters of the type in which the interior of a booster shell is divided by a booster piston into a forward first fluid chamber normally in communication with a vacuum source and a rearward second fluid chamber, and a cylindrical valve body integrally extended at the rearward surface of the booster piston is slidably supported on the rearward wall of the booster shell through a plain bearing, the valve body receiving therein an input rod and a control valve actuated by the input rod to permit the second fluid chamber to selectively communicate with the first fluid chamber or atmosphere so that when atmospheric pressure is introduced into the second fluid chamber, the booster piston is actuated by the pressure difference between the first and second fluid chambers.

2. Description of the Prior Art

In a conventional servo-booster of this type, as shown in FIG. 2, a plain bearing 010 carrying a cylindrical valve body 08 is fitted into a cylindrical support portion 03a extended from the rearward side wall of a booster shell 01 and retained in position by means of an elastic stop ring C, and accordingly, the number of parts and machining portions increases. It is therefore extremely difficult in terms of machining accuracy to register three elements, the booster shell 01, the plain bearing 010 and the valve body 08 on the same axis. In addition, with respect to the plain bearing 010, there is required fluid tightness at two portions, one being of the fitted portion between the bearing and the cylindrical support portion 03a, the other being of the sliding portion between the bearing and the valve body 08. This requires an additional care in machining and assembling the device, resulting in an obstacle in an attempt to reduce the cost of the device.

SUMMARY OF THE INVENTION

It is therefore an object of the present invention to provide a differential pressure operated servo-booster which overcomes those disadvantages noted above with respect to prior arts by forming a plain bearing integrally with a booster shell in a seamless fashion.

In accordance with the present invention, there is provided a differential pressure operated servo-booster comprising a booster shell, a forward first fluid chamber and a rearward second fluid chamber defined by a booster piston within the booster shell and normally in communication with a vacuum source, a cylindrical valve body integrally extended at the rearward surface of the booster piston and slidably supported on the rearward side wall of the booster shell through a plain bearing, a control valve received within the cylindrical valve body to permit the second fluid chamber to selectively communicate with the first fluid chamber or atmosphere, and an input rod disposed within the cylindrical valve body and operatively connected to the control valve, the plain bearing being formed integral with the rearward side wall of the booster shell in a seamless fashion.

The above and other objects, features and advantages of the invention will become apparent from the following detailed description of the invention when taken in conjunction with the accompanying drawing, which illustrates a presently preferred embodiment of the invention.

DESCRIPTION OF THE PREFERRED EMBODIMENT

Figure 1:
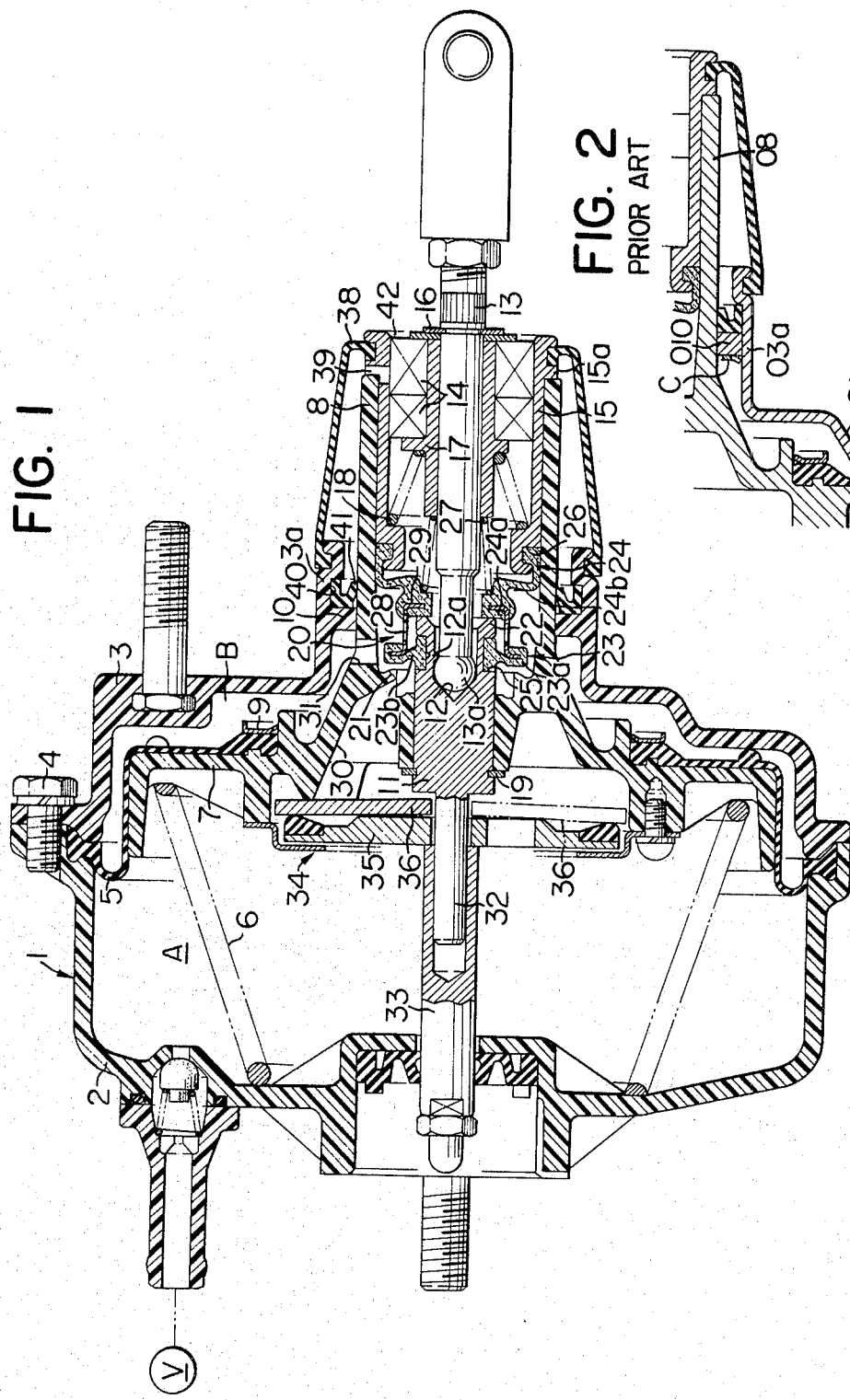
FIG. 1 is a longitudinal sectional view of one embodiment of a servo-booster in accordance with the present invention.
Figure 2:
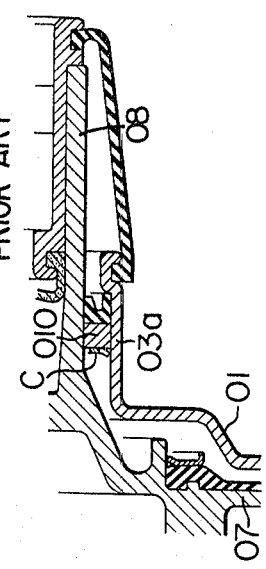
FIG. 2 is a fragmentary section of a conventional device.

The invention will be described by way of one embodiment with reference to the drawing. FIG. 1 shows a differential pressure operated servo-booster for actuating a vehicle brake system. A booster shell 1 comprises a pair of cupped parts 2 and 3 connected by means of a bolt 4, the booster shell having its interior divided by a diaphragm 5 clamped between the cupped parts 2 and 3 into a forward first fluid chamber A and a rearward second fluid chamber B, the first fluid chamber A being normally placed in communication with a vacuum source V, for example, with an intake manifold of the engine, the second fluid chamber B being placed in selective communication with the first fluid chamber A or atmosphere through a control valve 20 which will be described later.

A booster piston 7 normally urged rearwardly by means of a return spring 6 is closely disposed on the front surface of the diaphragm 5, and an inner peripheral end of the diaphragm 5 is fastened to the piston by means of a stop ring 9.

The rearward cupped part 3 is integrally formed at its central portion with a relatively short cylindrical support 3a projected rearwardly, the support 3a being formed at its inner peripheral surface with a plain bearing 10 integrally in seamless fashion. The booster piston 7 is integrally formed at its center portion with a relatively long cylindrical valve body 8 likewise projected rearwardly, the cylindrical valve body 8 being slidably supported on the plain bearing 10. Adjacent the rear portion of the plain bearing 10, an annular groove 40 is provided in the inner peripheral surface of the support 3a, into which annular groove an elastic seal member 41 is fitted to maintain fluid tightness in the sliding portion between the plain bearing 10 and the cylindrical valve body 8.

With this arrangement, if the booster shell, particularly the rearward cupped part 3 is formed of synthetic resin of good bearing property, for example, a polyamide resin, integral formation of the rearward cupped part 3 and the plain bearing 10 may be accomplished easily and the smooth slidability of the cylindrical valve body 8 can be assured. Also, if the booster piston 7 is molded of synthetic resin, integral formation of the booster piston and the cylindrical valve body 8 may be accomplished easily. The synthetic resin used in this case is preferably a material of higher hardness than the plain bearing 10 in order to prevent a damage to the sliding surface of the cylindrical valve body 8. For example, when polyamide resin is used for the plain bearing 10, phenol resin can be used for the cylindrical valve body 8.

A control piston 11 is slidably supported in the center of the booster piston 7, a spherical front end 13a of an input rod 13 connected to a brake pedal not shown is inserted into an engaging bore 12 at the rear end of the control piston 11 within the cylindrical valve body 8, and a part 12a of the side wall of the engaging bore 12 is caulked so that the control piston 11 and the input rod 13 are connected.

A cylindrical member 15 having an atmosphere inlet 42 at the rear end thereof slidably filled with a filter medium 14 is inserted internally of the cylindrical valve body 8, the cylindrical member 15 having a shoulder 15a at the rear end thereof abutting on the rear end of the cylindrical valve body 8. The filter medium 14 is clamped by a stop ring 16 secured onto the input rod 13 and a clamp member 17, and a return spring 18 for biasing the input rod 13 in a retracting direction is compressively retained between the clamp member 17 and the cylindrical member 15. This return spring 18 also serves as a mounting spring for holding the cylindrical member 15 in an abutment position between the shoulder 15a and the cylindrical valve body 8. The retracting limit of the integrally connected control piston 11 and input rod 13 is controlled by abutment between a stop ring 19 secured to the front end of the control piston 11 and the booster piston 7.

Between the cylindrical support 3a and the shoulder 15a of the cylindrical member 15 is extended a dust boot 38 which covers the outer periphery of the cylindrical valve body 8 extending rearwardly from the support 3a, the boot 38 being interiorly communicated with the air filter medium 14 through a vent hole 39 formed in the shoulder 15a.

A control valve 29 is constructed within the cylindrical valve body 8 in the following manner.

That is, the cylindrical valve body 8 is formed at its internal front surface with a first valve seat 21 encircling the control piston 11, and a second valve seat 22 is formed at the rear end of the control piston 11. An annular first valve member 23 having an outer peripheral portion formed in a valve portion 23a engageable with and disengageable from the first valve seat 21 and an intermediate portion formed in a flexible wall 23b has an inner peripheral portion received into an outer peripheral groove 25 at the rear of the control piston 11. Also, an annular second valve member 24 having an inner peripheral portion formed in a valve portion 24a engageable with and disengageable from a second valve seat 22 and an intermediate portion formed in a flexible wall 24b has an outer peripheral portion received between an outer peripheral groove 26 of the cylindrical member 15 and the inner surface of the cylindrical valve member 8. Both the valve members 23 and 24 are formed of an elastic material such as rubber and connected to the valve portions 23a and 24a, respectively, by baking both ends of a reinforcing ring 29 thereto, the reinforcing ring 29 having a through-bore 28 formed in the side thereof. Thus, a spacing between the valve portions 23a and 24a is maintained smaller than a spacing between the valve seats 21 and 22 in the retracted position of the control piston 11 by means of the reinforcing ring 29, these valve portions being normally biased forwardly by means of a valve spring 27.

The inside of the first valve seal 21 communicates with the first fluid chamber A through a through-bore 30 formed in the booster piston 7, the outsides of the first and second valve seats 21 and 22 communicate with the second fluid chamber B through a through-bore 31 formed in the side of the cylindrical valve body 8, and the inside of the second valve seat 22 communicates with the atmosphere through the interior of the cylindrical member 15, and hence through the filter medium 14.

A small diameter shaft 32 integrally extending lrom the forward end of the control piston 11 has an output rod 33, which extends through the forward cupped part 2, slidably supported thereon, the output rod 33 being connected at the rear end to the booster piston 7 through a reaction means 34 which will be described later and at the forward end to a well known brake master cylinder not shown.

The reaction means 34 comprises a reaction disk 35 in abutment against the output rod 33 slidably supported on the small diameter shaft 32 and a plurality of reaction levers 36 radially disposed in the periphery of the small diameter shaft 32 between the disk 35 and the booster piston 7.

The above described booster operates as follows:

In the illustrated unactuated state of the booster, the control piston 11 is held at its retracted limit by virtue of the force exerted by the return spring 18, and since at this time, the spacing between the first and second valve seats 21 and 22 is larger than the spacing between the valve portions 23a and 24a controlled by the reinforcing ring 29, the rearward valve portion 24a engages the second valve seat 22 by the force of the valve spring 27 whereas the forward valve portion 23a is forced apart from the first valve seat 21. Thus, the first and second fluid chambers A and B are in communication with one another through the through-bores 30 and 31 but out of communication from the interior of the cylindrical member 15 communicating with the atmosphere. Accordingly, the vacuum within the first fluid chamber A from the vacuum source V is introduced also into the second fluid chamber B so that pressures in both the fluid chambers A and B are balanced. As a result, the booster piston 7 is urged and held by the return spring 6 at the retracted limit at which the booster piston 7 is carried on the rearward cupped part 3, and accordingly, the output rod 33 also occupies the illustrated retracted position.

When the input rod 13 is forced against the return spring 18 by operation of a brake pedal, in order to brake the vehicle, to thereby cause the control piston 11 to advance, the valve portion 24a of the second valve member 24 follows the advancing second valve seat 22 while deforming the flexible walls 23b and 24b of the valve members 23 and 24 by the force of the valve spring 27 at an initial stage. However, when the valve portion 23a of the first valve member 23 is engaged with the first valve seat 21 by the predetermined advancement of the control piston 11, the valve portion 24a of the second valve member 24 stops so that the second valve seat 22 is caused to part from the valve portion 24a. As a consequence, communication between the fluid chambers A and B is no longer provided, and the second fluid chamber B communicates with the interior of the cylindrical member 15 through the through-bores 28 and 31 to introduce the atmosphere purified by the air filter medium 14 into the second fluid chamber B. Thus, the second fluid chamber B will have pressure higher than that of the first fluid chamber A, by which difference in pressure, the booster piston 7 starts forward movement against the return spring 6, that is, it starts output actuation, whereby the output rod 33 is actuated forwardly through the reaction lever 36. At this time, the cylindrical valve body 8 axially slides along the plain bearing 10 to prevent oscillation of the booster piston 7.

At the same time, the operational reaction of the output rod 33 is partly fed back to the control piston 11, and thus the input rod 13 through the reaction lever 36 whereby the operator can sense this to know the magnitude of the output of the output rod 33.

When the first fluid chamber A is in a no-vacuum state due to a trouble of the vacuum source system of the booster, the input to the control piston 11 is transmitted to the output rod 33 through the reaction lever 36 and the reaction disk 35 and therefore the brake master cylinder is operated only by the input.

When the cylindrical valve body 8 moves forward and backward along with the booster piston 7 as the booster is actuated and deactuated, the dust boot 38 encircling the rear projected portion of the cylindrical valve body 8 may be expanded and contracted to draw the atmosphere purified by the air filter medium 14 through the vent hole 39, thus preventing the dust boot 38 from being burst and at the same time preventing dust in air from entering the sliding portion between the cylindrical valve body 8 and the plain bearing 10.

As described above, in accordance with the present invention, since the plain bearing for slidably supporting the cylindrical valve body associated with the booster piston can be formed integral with the rear side wall of the booster shell in a seamless fashion, there occurs no possible misalignment between the booster shell and the plain bearing and thus the accuracy in alignment between three elements, i.e., the booster shell, the plain bearing and the cylindrical valve body can be stabilized.

Moreover, the fluid tightness relative to the plain bearing is required only at one place or a sliding portion between the plain bearing and the cylindrical valve body and thus the number of portions to be sealed of the plain bearing is reduced by half as compared with prior art. As a result, it is possible to easily and positively hold the fluid tightness to prevent leakage of pressure from the second fluid chamber at the rear portion of the booster shell, thus ensuring effective actuation of the booster piston.

In addition, since the number of parts and machining places is less than the conventional devices and the assemblability is high, the booster can be provided at low cost.

What is claimed is:

1. A differential pressure operated servo-booster comprising a booster shell having a cylindrical support, a forward first fluid chamber and a rearward second fluid chamber defined by a booster piston within the booster shell and normally in communication with a vacuum source, a valve cylinder integrally extended from the rearward surface of the booster piston and slidably received in the cylindrical support, a control valve received within the valve cylinder to permit the second fluid chamber to selectively communicate with the first fluid chamber or atmosphere, and an input rod extending through the valve cylinder and operatively connected to the control valve, the improvement comprising a plain bearing formed integral with the cylindrical support in a seamless fashion for slidably supporting the valve cylinder, and an annular recess in the inner surface of the cylindrical support for receiving a ring seal which seals between the cylindrical support and the valve cylinder, the booster shell, the cylindrical support and the plain bearing being integrally formed with each other from a synthetic resin, the valve cylinder being integrally formed with the booster piston from a synthetic resin having a hardness higher than the plain bearing.

* * * * *